United States Patent [19]

Fuller

[11] Patent Number: 5,697,413
[45] Date of Patent: Dec. 16, 1997

[54] METHOD AND MACHINE FOR FABRICATING A DECORATIVE INLAID FLOOR

[76] Inventor: Maurice D. Fuller, 15762 N.E. Virginia Point Rd., Poulsbo, Wash. 98370

[21] Appl. No.: 658,221

[22] Filed: Jun. 4, 1996

[51] Int. Cl.⁶ .................. B27B 1/00; B27F 1/00; B27C 5/00

[52] U.S. Cl. .................. 144/356; 144/24.16; 144/135.2; 144/332; 144/354; 144/371; 156/257; 156/265; 409/178; 364/471.02; 364/474.25

[58] Field of Search .................. 29/26 A; 364/474.01, 364/474.02, 474.03, 474.25; 144/24.16, 134.1, 135.2, 136.1, 48.1, 92, 144.52, 330, 332, 354, 356; 156/250, 256, 257, 265; 409/175–182, 191, 197, 199, 202, 235, 238

[56] References Cited

U.S. PATENT DOCUMENTS

| | | | |
|---|---|---|---|
| 2,643,689 | 6/1953 | Sherman | 144/24.16 |
| 2,643,690 | 6/1953 | White | 144/24.16 |
| 3,547,170 | 12/1970 | Maxey | 144/332 |
| 4,575,805 | 3/1986 | Moermann et al. | 364/474.05 |
| 4,830,555 | 5/1989 | Conachen | 409/178 |
| 5,040,581 | 8/1991 | Takashima | 144/144.51 |
| 5,106,243 | 4/1992 | Hunt | 409/178 |
| 5,110,239 | 5/1992 | Riley et al. | 409/12 S |
| 5,249,614 | 10/1993 | Osborn | 144/371 |
| 5,297,907 | 3/1994 | Strait et al. | 409/238 |
| 5,340,247 | 8/1994 | Cuneo et al. | 144/135.2 |
| 5,383,751 | 1/1995 | Wheetley et al. | 408/1 R |
| 5,486,746 | 1/1996 | Suzuki | 318/569 |
| 5,575,099 | 11/1996 | Strobeli et al. | 144/134.1 |

*Primary Examiner*—W. Donald Bray
*Attorney, Agent, or Firm*—Woodard, Emhardt, Naughton, Moriarty & McNett

[57] ABSTRACT

A method of creating a decorative inlaid floor includes the first step of providing a cutting implement, such as a router, which is operable to machine an inlay recess in a finished wood floor. The next step is to position the router over a section of the floor and move the router in a particular manner so that the desired inlay recesses are machined. The operating and movement step requires that the decorative pattern be predetermined and a control program or NC tape be generated so as to control the drive motors which are associated with each of four slide assemblies. Once the desired inlay recesses are machined into the main floor, the control program is modified by scaling it up to a larger size and is then utilized on a panel of a contrasting material. A typical example would be to select a contrasting wood for the inlay elements. The reprogrammed router is then located over the second material panel and operated so as to machine a larger inlay recess in that second material panel. A by-product results in the form of a "plug" which has a size and shape virtually identical to the inlay recess machined in the main floor. In this manner, a precise fit is ensured, allowing for the fast and efficient conversion of a finished wood floor into a decorative inlaid floor.

12 Claims, 4 Drawing Sheets

METHOD AND MACHINE FOR FABRICATING A DECORATIVE INLAID FLOOR

BACKGROUND OF THE INVENTION

The present invention relates in general to the construction of wood floors and to methods of creating a decorative inlay in such floors. More specifically the present invention relates to a method of economically creating and installing a decorative inlay in a wood floor after the wood floor has been laid. Associated with the novel and unobvious method is a portable, programmable router assembly which is designed to be brought to the job site, assembled, and accurately programmed to ensure the desired preciseness in the shape and fit of the inlay elements.

Decorative elements have been incorporated into wood floors for many years. However, prior to the present invention, the decorative elements were installed at the time the main flooring material was being attached to the subfloor. The typical prior art approach was to prepare the decorative elements at an off-site workshop and then move the elements to the job site. Then, as the subfloor and main floor were being created and assembled, the decorative elements were pieced into the main floor.

As far as the typical materials for the decorative inlays, wood is the most common, but tile, marble, and metal have been used. Dark woods are often installed in place of light woods to provide contrasting colors, such as for a room border. While there is no significant limitation as to the shape of the decorative inlays, regular geometric shapes are probably the most common. One reason for this popularity is the ability to fairly accurately reproduce the inlay so that a repeating pattern of the same size and shape can be created. These regular geometric shapes are arranged into prefabricated decorative modules, consisting of multiple individual elements, and thereafter installed. The installation procedure begins by placing the modules on the subfloor and then fitting abutting elements of the main floor around the modules, similar to the completion of a jigsaw puzzle or a tile mosaic. One example of this prior art method is depicted by a parquet floor.

Over the years various United States patents have been issued which describe methods, concepts, and structures relating to hardwood floors. Representative of these various United States patents are U.S. Pat. No. 5,040,581 which issued Aug. 20, 1991 to Takashima and U.S. Pat. No. 5,249,614 which issued Oct. 5, 1993 to Osborn. The Takashima patent employs a jig to which a router is slidably attached. The Osborn patent also employs a router which is mounted on a slide which is carried by a frame. It will be seen that the present method also employs a frame and router and accordingly, earlier patents which describe this style of machine tool, and the related fixtures, frames, and routers might be of interest relative to the disclosure of the present invention. Representative of such earlier patents are U.S. Pat. No. 5,106,243 which issued Apr. 21, 1992 to Hunt; U.S. Pat. No. 5,297,907 which issued Mar. 29, 1994 to Strait et al.; U.S. Pat. No. 5,383,751 which issued Jan. 24, 1995 to Wheetley et al.; and U.S. Pat. No. 5,486,746 which issued Jan. 23, 1996 to Suzuki.

While there are a variety of devices disclosed by the listed patents, there is nothing which suggests the method and equipment of the present invention. By means of the present invention, decorative inlays of contrasting materials and/or colors of virtually any configuration can be made and installed after the original floor has been laid. The invention makes use of a programmable router whose movement may be controlled by either a computer program or a numerically controlled tape. This programmable router is specifically configured to be transportable to the job site. Likewise, the frame which is used to support various motorized slide assemblies and the programmable router may also be transported to the job site and set up at that location.

The programmable router is used to machine out inlay recesses in the main flooring as well as machine a larger recess (of identical shape) in the inlay material. The computer control which creates the inlay recesses in the main flooring is modified so as to create the larger inlay recesses in the contrasting inlay material. The machining effort directed to the contrasting inlay material results in an interior plug being left behind which has a size and shape virtually identical to the inlay recess which has been machined in the main flooring. In this manner, the inlay elements have a close and precise fit in the corresponding inlay recesses. After the matching inlay elements are installed in their corresponding recesses, the main floor can be sanded to a smooth surface and then finished. It is also envisioned that the contrasting material can be stained either before or after being installed into the inlay recesses and a thin layer of adhesive may also be used to enhance the hold of an inlay element within its corresponding inlay recess.

SUMMARY OF THE INVENTION

A method of creating a decorative inlaid floor according to one embodiment of the present invention comprises a series of steps beginning with the step of providing a cutting implement with a machining bit, the cutting implement being operable to machine an inlay recess in a section of main flooring. This initial step is followed by the steps of positioning the cutting implement over a section of the main flooring and operating the cutting implement so as to machine all desired inlay recesses in the main flooring section. Once the desired inlay recesses are created in the main floor, a panel of a second and contrasting material is provided which is then used for fabrication of at least some of the desired inlay elements. The same cutting implement which was used to create the inlay recesses is now positioned over the second material panel and operated for machining the desired second material inlay recesses. Each second material inlay recess corresponds to each main floor inlay recess in shape, though the second material inlay recesses are of a larger size. In this manner, a corresponding inlay plug remains after each second material inlay recess is machined. Each inlay plug has a size and shape which is substantially identical to a corresponding one of the machined inlay recesses. The final step is to install each inlay plug as an inlay element into its corresponding inlay recess.

According to another embodiment of the present invention, a three-axis router drive mechanism is disclosed. The router drive mechanism is used for the fabrication of an inlaid floor beginning with a finished main floor. The router drive mechanism includes a support frame with a pair of guide rails which are constructed so as to be attached to the finished main floor. First and second motorized slide assemblies are slidably assembled to the support frame in a substantially parallel and spaced apart manner. Each of the first and second slide assemblies includes a movable carriage. There is a third motorized slide assembly which is attached at one end to the first motorized slide assembly carriage and attached at an opposite end to the second motorized slide assembly carriage. The third motorized slide assembly includes its own movable carriage which receives a motorized router slide assembly. A carriage on the motorized router slide assembly is designed for receipt of a router.

One object of the present invention is to provide an improved method of creating a decorative inlaid floor.

Another object of the present invention is to provide an improved three-axis router drive mechanism for the fabrication of an inlaid floor.

Related objects and advantages of the present invention will be apparent from the following description.

DESCRIPTION OF THE PREFERRED EMBODIMENT

Figure 1:
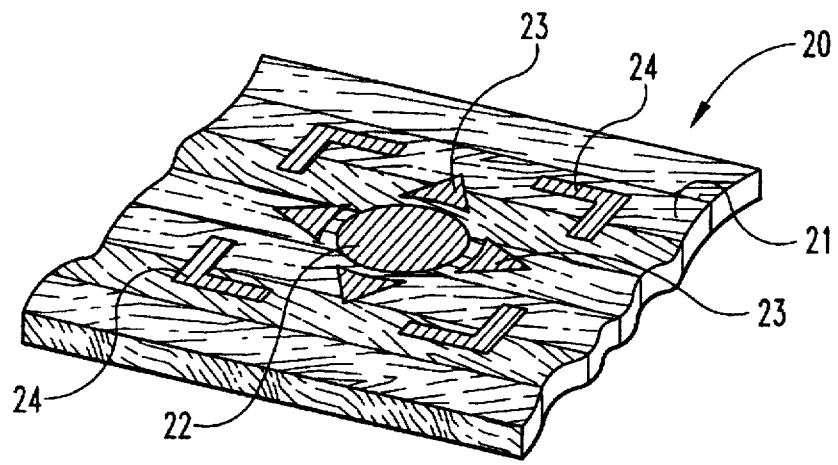
FIG. 1 is a perspective view of a decorative inlaid floor which has been fabricated according to the described method of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a portion of a decorative inlaid floor 20 which includes a main floor 21 and a plurality of inlay elements 22, 23, and 24. Element 22 is a circular piece of contrasting color to that of the main floor. Element 22 may be a piece of contrasting wood or some other material such as metal, tile, or marble. The contrasting color relative to the color of the main floor may be provided by the choice of material or by painting or staining. Elements 23 (four total) each have an arrowhead shape and are also of a contrasting color (and/or material) to that of the main floor 21. All four elements 23 are virtually identical to each other and are arranged in a uniform pattern with 90 degrees spacing. Elements 22 and 23 may be created from the same material and may be of the same color. Alternatively, elements 22 and 23 may be of a contrasting style to each other. This may be achieved by changing the materials or the color or both. Finally, elements 24 are each L-shaped pieces, all four of which are substantially identical to each other. Elements 24 may be fashioned of a contrasting color to the main floor as well as of a contrasting color relative to elements 22 and 23. The contrasting color may be achieved by the choice of materials as well as by painting or staining of elements 24 in a manner different from that selected for elements 22 and 23.

In the FIG. 1 design, the main floor has a medium oak stain. The inlay element 22 is fabricated out of wood with a medium walnut stain. Inlay elements 23 are also fabricated out of wood with a dark walnut stain. Inlay elements 24 are fabricated out of wood with a light oak stain. As indicated, one design alternative is to replace elements 22, 23, and 24 with plain or colored pieces of tile or marble. Metal may also be used and the contrasting appearance may be created by the type of surface finish or treatment which is selected for the metal elements. The illustrated design pattern which is inlaid into main floor 21 is one portion of a repeating pattern which may repeat in either the X-direction or the Y-direction, using conventional notation, or both directions. The illustrated design pattern which is inlaid into main floor 21 may alternatively represent a single pattern which is not repeating. Further, the size options for the illustrated design pattern and the individual inlay elements can range from very small to very large, depending on the decorative effect which is desired and the size of the main floor.

Figure 2:
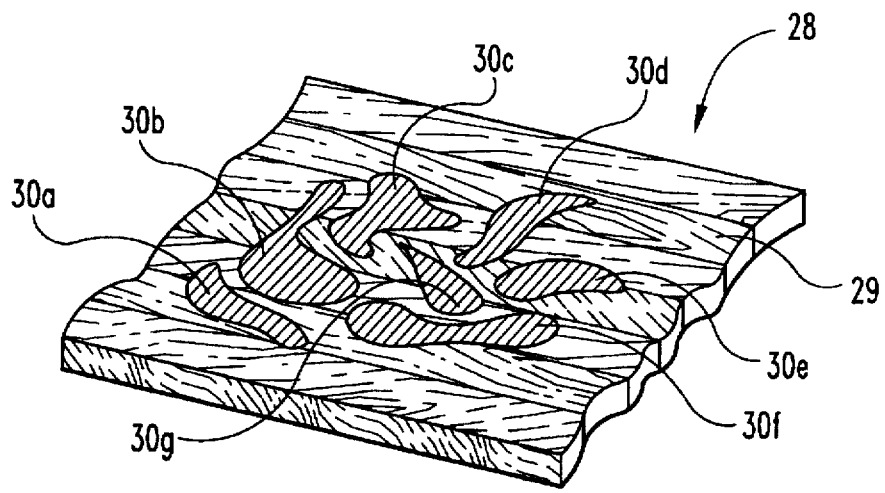
FIG. 2 is a perspective view of a decorative inlaid floor which has been fabricated according to the described method of the present invention.

Referring now to FIG. 2, a less structured or uniform decorative inlaid floor 28 is illustrated. Floor 28 includes a main floor 29 and a plurality of inlay elements 30a–30g. While decorative inlaid floor 28 has a more structured design due to the design uniformity and the use of fairly basic geometric shapes, inlaid floor 28 incorporates a more free-flowing pattern of irregular design shapes. Similar to the design of floor 20, inlay elements 30a–30g are each fabricated in a contrasting color relative to the color of main floor 29. This contrasting color is created by using a different wood or other material or by means of a different stain or paint. While each of the inlay elements 30a–30g may be of the same contrasting color to each other, they may also be of different colors to each other, depending on the design expression which is desired. Uniquely shaped tile pieces or marble may be used for inlay elements 30a–30g. In the preferred embodiment as illustrated in FIG. 2, inlay pieces 30a–30g are fabricated out of wood with a contrasting stain to the stain used for main floor 29. The design pattern depicted in FIG. 2 is one portion of a repeating pattern which may repeat in either the X-direction or in the Y-direction, using conventional notation, or in both directions. Alternatively, the design pattern depicted in FIG. 2 may be a single pattern which is not repeating in any direction.

When wood is used for inlay elements 22, 23, 24, and 30a–30g, one way to create a contrasting color to the color of the corresponding main floor is to use a different type of wood. Since different woods typically react differently to the same shade of stain, the same stain can be used and the change of color to the different woods will create contrasting colors between the inlay elements and the main floor. This results in the final floor having a decorative design which can still be visually perceived and enjoyed.

The descriptions which follow are applicable to either inlaid floor 20 or inlaid floor 28. The decision to illustrate two different styles of inlaid floors is simply to represent that the method and apparatus of the present invention, and the resulting decorative floor, may be precise and structured or free flowing and unstructured.

Figure 3:
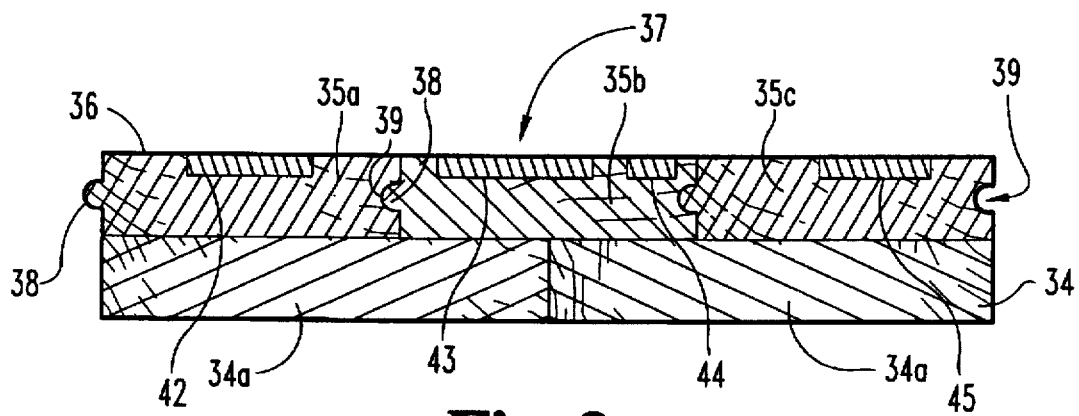
FIG. 3 is a side elevational view in full section of a portion of an inlaid floor.
Figure 4:
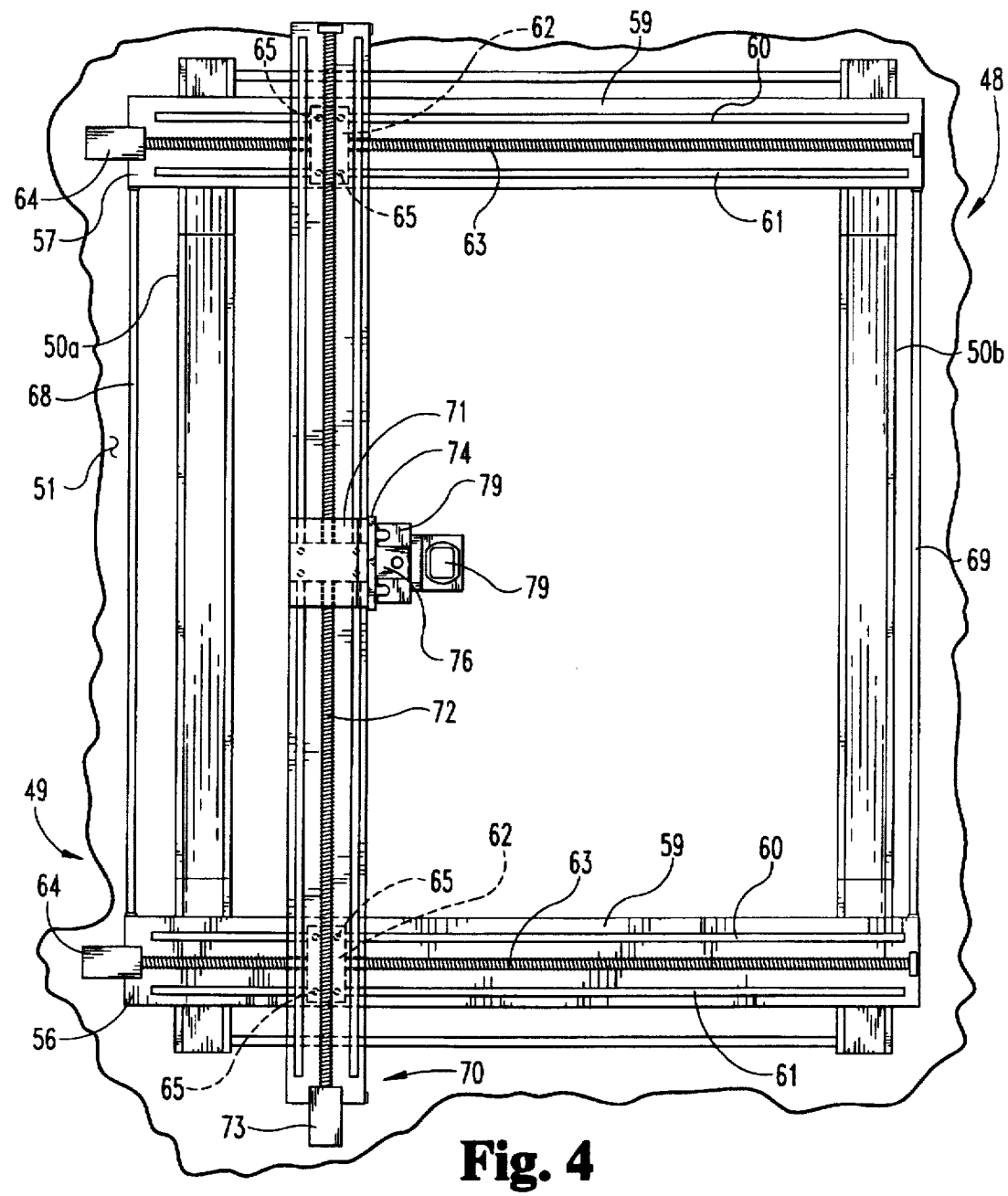
FIG. 4 is a top plan view of a router/slide assembly which is suitable for use in practicing the method of the present invention.
Figure 5:
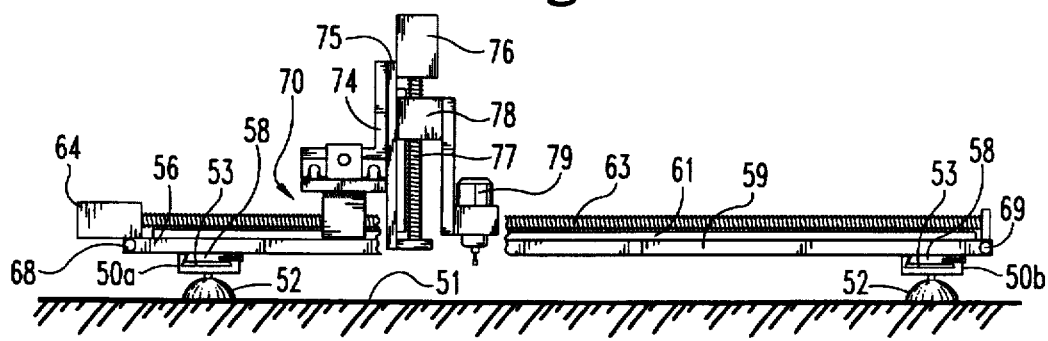
FIG. 5 is a side elevational view of the FIG. 4 router/slide assembly.
Figure 6:
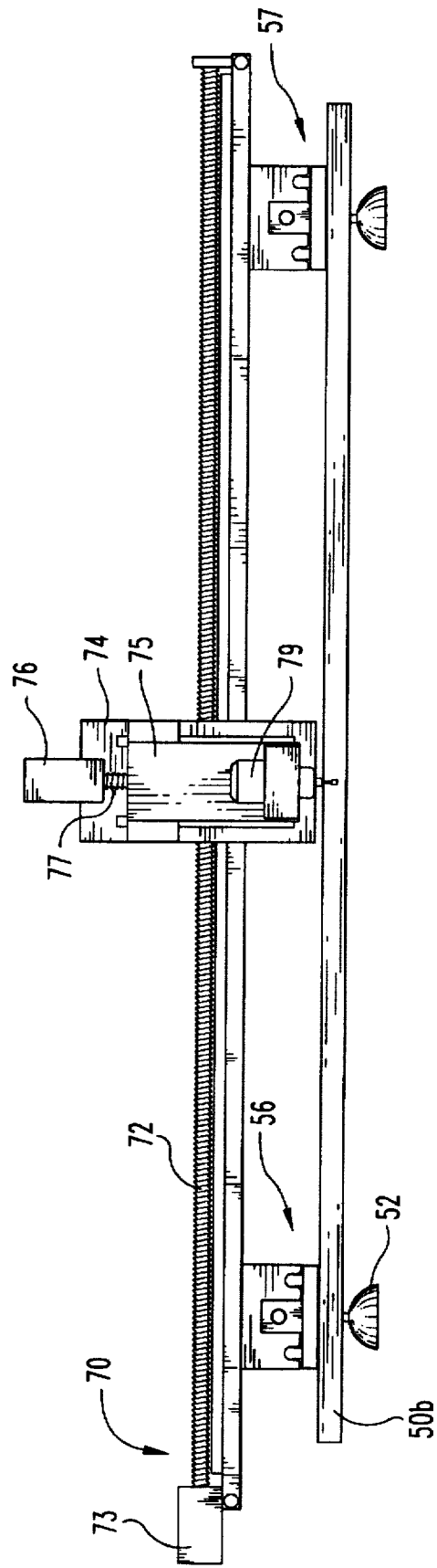
FIG. 6 is a front elevational view of the FIG. 4 router/slide assembly.
Figure 7:
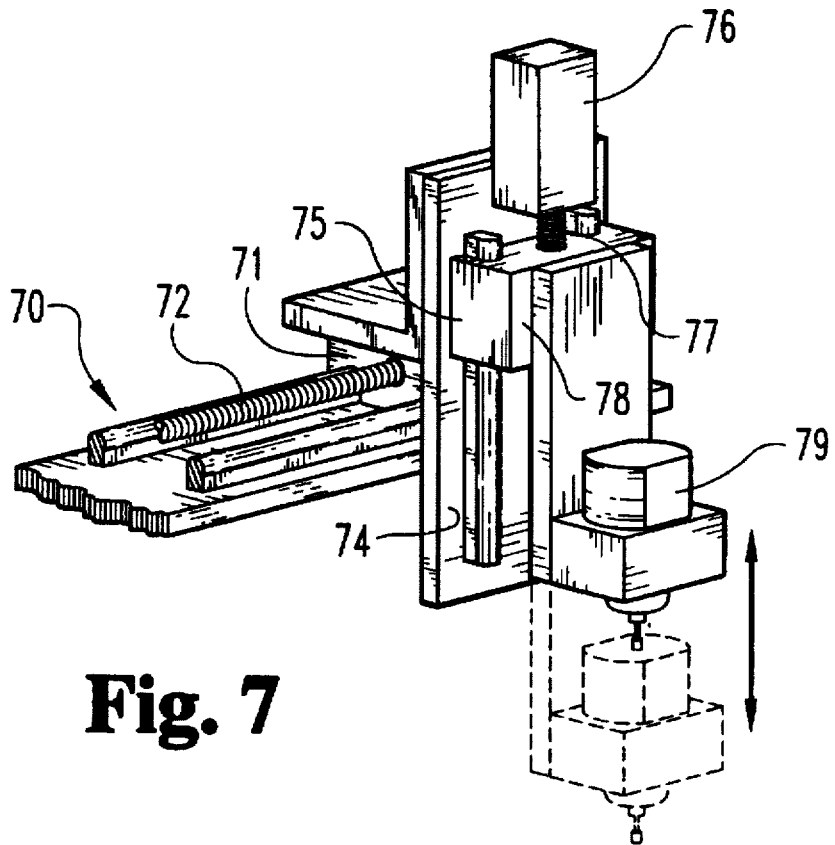
FIG. 7 is a partial perspective view of the FIG. 4 router/slide assembly.

With reference to FIG. 3, the typical construction for floors 20 and 28 includes a subfloor 34 which is created by laying a plurality of subfloor slats 34a side-by-side. The main floor slats 35a, 35b, 35c, etc., are each designed with a tongue-in-groove shape in the side-by-side or horizontal direction for creating interlocking engagement in a vertical direction which is substantially perpendicular to the planar surface 36 of the final floor 37. The projecting tongue or rib 38 of one slat fits into the groove or channel 39 of the adjacent slat, and so forth as is illustrated. While this approach allows horizontal or side-by-side movement in order to create the tongue-in-groove interfit, it is not possible for one slat to pull away from the adjacent slat in an upward or vertical direction.

In order to provide recesses 42, 43, 44, and 45, for example, in the plurality of slats 35a, 35b, and 35c, a router is used to mill or machine out the undesired wood and create the desired geometric shape. When creating the inlay recesses in the main floor, the router is programmed to scribe a particular shape and initially what is machined is an outline channel whose width approximates the diameter of the router bit. While the outer edge of this channel represents the outline of the corresponding inlay recess, there is a plug of material left in the center. This plug of material which actually has a shape that approximates the same shape as the inlay recess may be removed by use of the router or by chiseling this undesired wood free from the main floor. In order to control the depth of each inlay recess, and in order to provide a relatively smooth and flat lower surface at the bottom of each inlay recess, use of the router to remove the undesired "plug" wood is preferred. As described, each inlay recess is cut down into planar surface 36 of the main floor, a distance (Z-direction) which generally corresponds to the thickness of the inlay elements which will be inset down into inlay recesses 42-45, for example. The actual depth of the milled or machined cut into the main floor slats is dictated for the most part by the thickness of the inlay elements. If the inlay elements are wood, the final floor is sanded and finished after the inlay elements are installed.

A unique feature of the present invention is that the decorative inlay pattern is created after the subfloor and main floor are completed. The present invention allows the decorative inlay pattern to be added to any existing wood floor. In order to ensure a preciseness in the fit of the inlay elements into the inlay recesses, a computer program or NC tape is used to direct and control the movement of a programmable router. The program first creates the desired inlay recesses. The program is then scaled up in size so as to cut the inlay elements out of the selected contrasting material for each inlay element. When the control program for the router is scaled up in size and then operated on the contrasting inlay material, a virtually identical inlay shape is created in the contrasting material for each inlay recess. Effectively, the same procedure occurs in the contrasting material as occurred with the main floor. A channel is cut in the contrasting material which has a shape identical to that of the inlay recess. By scaling up an amount equal to the diameter of the router bit, the plug of material which is left on the interior just happens to have a size and shape which is virtually identical to that of the inlay recesses machined in the main floor. Consequently, the fit of the inlay elements into the machined inlay recesses is quite close, bordering on a line-to-line fit. Since there is very little side clearance, and in certain instances the inlay elements may have to be lightly tapped into position, the inlay elements tend to remain in the inlay recesses. However, a thin layer of adhesive is used when the inlay elements are installed. This is important when the inlay elements are metal, tile, marble, or similar material. While a layer of adhesive can also be used for wooden inlay elements, these elements will be sanded and stained. A lacquer or similar final treatment may also be used. The use of a liquid stain and/or lacquer tends to join and secure the inlay elements in position.

As described, the method of creating floors 20 and 28 begins with the fabrication of a wood floor including a subfloor and an overlapping main floor. The specifics of these two floor layers is not critical. Whether a tongue-in-groove design or some other style is used, the starting point for consideration of the present invention is that there is a completed, final wood floor which is going to be converted into a decorative inlaid floor. With this as a starting point, the first step is to decide on the decorative design which is desired for the final floor. While the router could be moved manually to create the desired design, the preferred approach is to create a computer program or a numerically-controlled (NC) tape in order to govern the operation of drive motors which control the movement of the router in X, Y, and Z directions.

The next step is to create a router-control frame and position the frame over the area of the wood floor to be machined so as to create the inlay recesses. A router and various router-drive subassemblies are mounted to the frame and the corresponding drive motors are programmed. The drive motors and router-drive subassemblies provide router movement much like a three-axis machine. The controlling program has a beginning or zero reference point and each portion of each inlay recess has a precise location in the X and Y directions. The Z direction is used for the depth of the machining cut down into the surface of the main floor.

The predetermined and programmed decorative pattern for the main floor is then machined (milled by the router) into the area of the main floor disposed beneath the router frame. Once all of the desired inlay recesses are machined into the main floor, the frame is then repositioned over another section of the wood floor and the process is repeated. The second pattern which is machined into the wood floor may be a repeating pattern of the first effort or may represent an entirely different design. The router frame is sequentially moved, section by section, throughout the entirety of the wood floor until all of the desired inlay recesses have been machined into the wood floor.

It is to be noted that all of the X and Y locations which are utilized to create the decorative inlay pattern remain as part of the computer or NC control to direct the movement of the router.

In order to fabricate the corresponding inlay elements which will then be fitted one by one into the inlay recesses, the computer program or NC tape is dimensionally scaled up an amount equal to the diameter of the router bit. In this way, when the scaled up router program is run on a panel of the inlay material, an outline with a width equal to the diameter of the router bit is machined into the inlay material. As previously described, while a virtually identical, though larger, opening is machined into the selected inlay material, a very important by-product also results. This by-product is a "plug" which is virtually identical in size and shape to the corresponding inlay recess which was previously machined into the main floor. One plug (inlay element) is created for each and every inlay recess. These plugs are then manually fit into each recess, with or without a layer of adhesive, and the floor is then finished. The finishing steps include sanding the inlaid floor, applying any stains, and then applying a final coat of a suitable sealer or lacquer. Another possible approach is to sand and stain the inlay elements before installation, especially when the desired stains for the main floor and for the inlay elements are different.

Referring to FIGS. 4-7, a suitable router support frame 48 and drive assembly 49 are illustrated. The support frame 48 includes two guide rails 50a and 50b which are secured to main floor 51 by means of a series of suction cups 52. These suction cups are spaced along the length of each guide rail 50a and 50b and are manually pushed down onto the main floor in order to secure the guide rails in position. The two guide rails are positioned on opposite sides of the floor area or section which is to be machined by the router. The two guide rails 50a and 50b are substantially parallel to each other and each one has a dovetail channel 53 disposed therein and opening upwardly. The suction cups are securely attached to the underside of these two guide rails.

Slidably mounted to each guide rail 50a and 50b are a pair of cooperating motorized slide assemblies 56 and 57. The underside of each slide assembly 56 and 57 includes a pair of oppositely disposed dovetail projections 58 which are compatibly sized and shaped to cooperate within the dovetail channels 53. This particular arrangement allows the slide assemblies 56 and 57 to be manually located at any point along the two guide rails 50a and 50b. Once the motorized slide assemblies are placed at the desired location, a locking stem can be inserted in order to lock the slide assemblies 56 and 57 at the desired location on the corresponding guide rails 50a and 50b.

Each motorized slide assembly 56 and 57 includes a base plate 59, two guide rails 60 and 61, a movable carriage 62, lead screw 63, and a drive motor 64. As each drive motor is energized, the lead screw rotates and the corresponding carriage travels long the lead screw. The two oppositely-disposed guide rails help to support and control the preciseness of the travel of the carriage. Four threaded holes 65 located in each carriage 62 provide a means to attach other slide assemblies. The two slide assemblies 56 and 57 are mounted so as to be parallel to each other and are secured in position by braces 68 and 69. Securely mounted to each carriage 62 of slide assemblies 56 and 57 is a third motorized slide assembly 70. Slide assembly 70 is aligned perpendicular to the first two slide assemblies 56 and 57 so as to provide a cooperating combination of slide assemblies for X and Y drive directions. Slide assembly 70 is constructed in a manner which is virtually the same as that of slide assemblies 56 and 57 with the one change that the dovetail projection 58 is replaced by mounting flanges with clearance holes and mounting hardware which is installed through the flanges into the four threaded holes 65. This assembly technique is used at each end of slide assembly 70 in order to secure the third slide assembly to each of the first two slide assemblies.

Carriage 71 is arranged to travel along lead screw 72 upon activation of drive motor 73. Vertically attached to carriage 71 is a router support bracket 74 which includes a slide track 75, a drive motor 76, lead screw 77, and carriage 78. This combination constitutes a fourth slide assembly which provides movement of router 79 in the Z-direction. Router 79 is attached to carriage 78 and is positioned in such a way that the router bit extends out over the section of floor which is framed by the two guide rails 50a and 50b and the first two slide assemblies 56 and 57.

As will be understood by an understanding of the foregoing description and by reference to FIG. 3, simultaneous activation and operation of the drive motors associated with slide assemblies 56 and 57 cause the third slide assembly 70 to move in the Y-direction. Activation and operation of the drive motor associated with slide assembly 70 causes the fourth slide assembly which receives the router to move in the X-direction. Finally, activation of drive motor 76 causes the router to move in a direction perpendicular to the plane of the paper which corresponds to travel in the Z-direction.

As illustrated in FIG. 3, the combination of slide assemblies enables movement of router 79 to any point or location in the section of floor which is to receive the inlay recesses. The drive motors which are associated with the various slide assemblies enable the router to be controlled and directed to create virtually any inlay recess style which one desires. The artistic creation begins with a design layout which is then converted into program language for programming of the various motors associated with the various slide assemblies. Once one inlay pattern is machined in the main floor section, the pattern is able to be repeated by sliding slide assemblies 56 and 57 in the X-direction along guide rails 50a and 50b to the next section of main floor. Movement in the Y-direction is achieved by releasing the suction cups and repositioning the two guide rails 50a and 50b.

Figure 8:
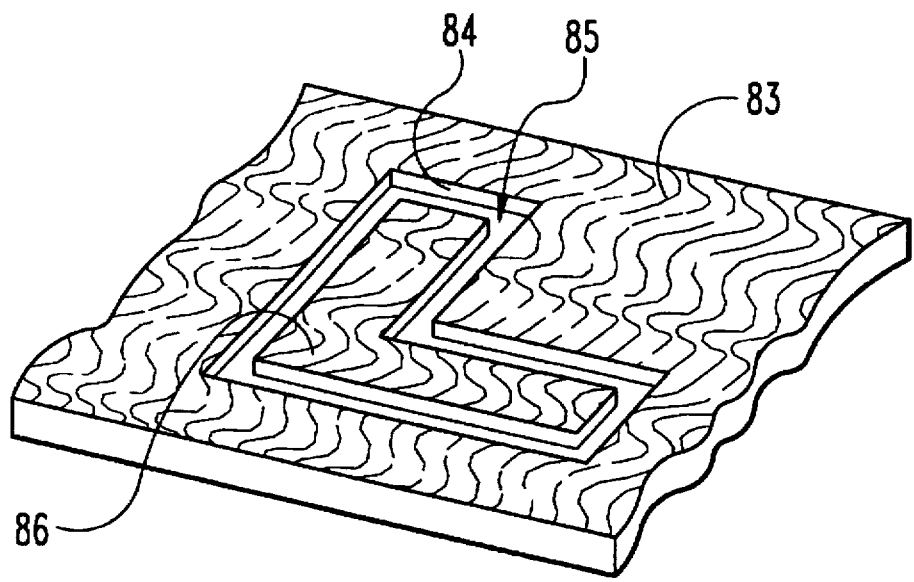
FIG. 8 is a perspective view of an inlay element being cut from a contrasting material panel.

After the inlay pattern is completed, the computer program or NC tape which is used to control the operation of the four drive motors is modified for cutting the inlay "plugs" out of the selected and contrasting inlay material (see FIG. 8).

The contrasting material panel 83 is a single thickness of material which is able to be machined completely through by the router. By scaling up the size of the desired pattern a specific shape is cut. Edge 84 represents the finishing cut made in the panel by the router. Channel 85 is the void created by removal of material and generally corresponds in width to the diameter of the router bit. Plug 86 has a shape virtually identical to edge 84 and a size which coincides with the inlay recess where this "plug" is to be installed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of creating a decorative inlaid floor which includes a main floor of a first material, at least one inlay recess machined into said main floor, and at least one inlay element installed into said at least one inlay recess, said method comprising the following steps:

providing a cutting implement with a machining bit which cutting implement is operable to machine an inlay recess in said main floor;

positioning said cutting implement over a section of said main floor which is to receive an inlay element;

operating said cutting implement and machining an inlay recess in said main floor section;

providing a second material panel for fabrication of a corresponding inlay element;

positioning said cutting implement over said second material panel;

operating said cutting implement and machining a second material inlay recess by guiding said cutting implement in a predetermined path which creates said second material inlay recess which corresponds in shape to said main floor inlay recess and being of a larger size than said main floor inlay recess and which leaves a corresponding inlay plug after said second material inlay recess is machined, said inlay plug which is left by said guiding step having a size and shape which is substantially identical to said corresponding main floor inlay recess; and installing said inlay plug as an inlay element into said corresponding main floor inlay recess.

2. The method of claim 1 which further includes the step of providing a support frame for said cutting implement.

3. The method of claim 2 which further includes the step of assembling motorized slide assemblies to said support frame.

4. The method of claim 3 which further includes the step of programming said motorized slide assemblies for the predetermined movement of said cutting implement for machining said at least one inlay recess.

5. The method of claim 4 which further includes the step of reprogramming said motorized slide assemblies for the predetermined movement of said cutting implement for machining said at least one second material inlay recess.

6. The method of claim 1 which further includes the step of applying adhesive into said at least one inlay recess prior to installing a corresponding inlay plug.

7. The method of claim 1 which further includes the step of connecting said cutting implement to a two-axis drive mechanism for movement of said cutting implement.

8. The method of claim 7 which further includes the step of programming said drive mechanism for movement of said cutting implement for machining said at least one inlay recess.

9. The method of claim 8 which further includes the step of reprogramming said drive mechanism for the movement of said cutting implement for machining said at least one second material inlay recess.

10. A three-axis router drive mechanism for the fabrication of an inlaid floor out of a finished main floor, said drive mechanism comprising:
- a support frame including a pair of guide rails which are constructed to attach to said finished main floor;
- first and second motorized slide assemblies slidably assembled to said support frame in a substantially parallel and spaced apart manner, each of said first and second slide assemblies including a movable carriage and a corresponding drive motor;
- a third motorized slide assembly attached at one end to said first motorized slide assembly carriage and attached at an opposite end to the second motorized slide assembly carriage, said third motorized slide assembly including a movable carriage; and
- a motorized router slide assembly attached to said third motorized slide assembly carriage and including a movable carriage for receipt of a router.

11. The drive mechanism of claim 10 which further includes an electronic control module for motion control of each of said slide assemblies.

12. The drive mechanism of claim 11 wherein each slide assembly includes a separate and corresponding drive motor for moving the corresponding carriage.

* * * * *